United States Patent [19]

Kasahara et al.

[11] Patent Number: 4,758,831
[45] Date of Patent: Jul. 19, 1988

[54] MATRIX-ADDRESSED DISPLAY DEVICE

[75] Inventors: Koichi Kasahara; Akira Saito, both of Yokohama, Japan

[73] Assignee: Kabushiki Kaisha Toshiba, Kawasaki, Japan

[21] Appl. No.: 793,784

[22] Filed: Nov. 1, 1985

[30] Foreign Application Priority Data

Nov. 5, 1984 [JP] Japan .................. 59-231220

[51] Int. Cl.$^4$ ............................................. H04Q 1/00
[52] U.S. Cl. ...................................... 340/805; 340/804
[58] Field of Search ............... 340/800, 801, 802, 803, 340/804, 750, 747, 767, 768, 789, 805, 811, 812, 813, 784

[56] References Cited

U.S. PATENT DOCUMENTS

| | | |
|---|---|---|
| 3,627,924 | 12/1971 | Fleming et al. . |
| 3,848,086 | 11/1974 | Ikeda et al. . |
| 4,031,541 | 6/1977 | Arisawa et al. . |
| 4,240,150 | 12/1980 | Ebihara et al. ................... 364/707 |
| 4,393,405 | 7/1983 | Ikeda . |
| 4,468,662 | 8/1984 | Tanaka ................................ 340/750 |
| 4,660,030 | 4/1987 | Maezawa ........................... 340/784 |

FOREIGN PATENT DOCUMENTS

| | | |
|---|---|---|
| 2023692 | 11/1970 | Fed. Rep. of Germany . |
| 2843706 | 4/1979 | Fed. Rep. of Germany . |
| 3326517 | 1/1984 | Fed. Rep. of Germany . |
| 3329130 | 2/1984 | Fed. Rep. of Germany . |
| 3411102 | 10/1984 | Fed. Rep. of Germany . |

OTHER PUBLICATIONS

Funkschau, Heft 18, 1974, W. S. "Flacher Fernsehschirm mit Gasentladungsbild", pp. 697-698.
Funkschau, Heft 3, 1985, Dr. A. Schauer, "Flacher Farbbildschirm: Anders als die Anderen", pp. 32-35.
RCA COS/MOS Integrated Circuits Manual, CMS-271, printed in USA 6/72, FIG. 83 of p. 93 and lines 2-6 of p. 92 (right column).

Primary Examiner—Ulysses Weldon
Attorney, Agent, or Firm—Oblon, Fisher, Spivak, McClelland & Maier

[57] ABSTRACT

The invention is directed to a matrix-addressed display device having a matrix-addressed display element such as a liquid crystal element. The device comprises a sampling frequency generator generating sampling frequency signals. By the sampling frequency signals, the serially input video signals are sampled, held and consequently converted serial to parallel. The sampling frequency generator is provided with means for stopping the sampling frequency signal in periods when serial-parallel conversion is not required.

2 Claims, 4 Drawing Sheets

MATRIX-ADDRESSED DISPLAY DEVICE

BACKGROUND OF THE INVENTION

1. Field of the Invention

This invention relates to a matrix-addressed display device that displays for example a TV picture, more particularly to the construction of a sampling frequency genertor in serial-parallel conversion by sampling the input picture signal.

2. Background of the Prior Art

Recent years have witnessed rapid advances in the technology of TV picture display terminals employing matrix-addressed display elements using liquid crystals, and some of these advances have reached the stage of being utilized in practice. In such matrix-addressed display devices, the video signal has to be supplied to a large number of signal lines and sampling used to perform serial-parallel conversion on the TV signal etc., which is in the form of a dot-sequential signal.

"Serial-parallel conversion'38 means that serial data, i.e. data that is time-serially transmitted on a single transmission line, is converted to parallel data that is simultaneously transmitted on a plurality of transmission lines. Such serial-parallel conversion is utilized in a matrix-addressed display device that is driven by one-line-at-a-time addressing.

A typical matrix-addressed liquid crystal display device has a rectangular display panel consisting of thin film transistors (TFT) arranged in a matrix constituted by the points of intersection of respective signal lines $X1, \ldots, Xm$ and address lines $Y1, \ldots, Yn$, which are provided in the horizontal direction (X axis direction or main addressing direction) and vertical direction (Y axis direction or ancillary addressing direction). To display a picture, the temporarily stored serial picture signal is supplied in parallel to all of the signal lines $X1 \ldots Xm$, simultaneously, and then selected and displayed by the address lines $Y1 \ldots Yn$, Each scan of the address lines gives one picture frame.

To operate this matrix display, a picture signal source, frame inverting amplifier, synchronizing signal separator, control circuit, Y driver and X driver are arranged around the periphery of the display panel. The X driver is provided with a sampling pulse generator and sample and hold circuit. The picture elements within the liquid crystal display panel are constituted by a TFT, a signal storage capacitor, a liquid crystal cell and a counter electrode common to all the picture elements.

FIG. 6 is a waveform diagram given in explanation of the operation of such a display device. a and b are respectively the vertical synchronizing signal and horizontal synchronizing signal obtained at the output of the synchronizing signal separator. c is the vertical scanning start signal. This is generated under the control of the abovementioned synchronizing signals. Horizontal synchronizing signal b and vertical scanning start signal c are fed to the Y driver to address, one line at a time, the address lines $Y1, \ldots, Yn$ of the liquid crystal display panel. Also d is the picture signal. This is supplied from the picture signal source through the frame inverting amplifier to the sample and hold circuit. The drawing shows the period of a single horizontal scan. e1 and f are respectively the sampling frequency signal and horizontal scanning start signal. These signals are generated under the control of the horizontal synchronizing signal b. It should be noted that, in the Figure, the length of the time axis of the other signals shown below signal d is the same as in the case of signal d itself.

Of these, the sampling frequency signal e1 and the horizontal scanning signal f are supplied to the sampling pulse generator, which is constituted by a shift register, and generates sampling pulses $S1, \ldots, Sm$. These sampling pulses $S1, \ldots, Sm$ are supplied to the sample and hold circuit, which converts the picture signal d into a parallel picture signal by a sequential sample-and-hold operation performed with the period of the horizontal scanning. When this conversion is completed, the parallel picture signal is simultaneously delivered, under the control of output enable pulse g from the control circuit, from the sample and hold circuit to the signal lines $X1, \ldots, Xm$ of the liquid crystal panel. This causes the picture signal voltage to be written from the signal lines $X1, \ldots, Xm$ into the signal storage capactiors, through those TFT which are in an on-state as a result of one or other of the address lines $Y1, \ldots, Yn$ having been put into the selected state by the vertical scanning pulse from the Y driver. The picture is displayed by excitation of the liquid crystal cells by the picture signal voltage, which is held for the frame scanning period.

However, in the prior art display device, the sampling frequency generator is provided in the control circuit. FIG. 7 shows the construction of a frequency synthesizer in which a PLL (Phase-Locked Loop) is utilized as this sampling frequency generator. As shown in FIG. 7, this sampling frequency generator is composed of a voltage controlled oscillator 10, a counter 11, a phase comparator 12, a low pass filter 13, a reference frequency input terminal 14 and an oscillating frequency output terminal 15. By setting the count of counter 11 to a desired value, for example K, this enables a frequency of K times the horizontal synchronizing frequency, as shown in e1 of FIG. 6, to be obtained at oscillating frequency output terminal 15 when the horizontal synchronizing signal shown at b of FIG. 6 is supplied to reference frequency input terminal 14.

However, with a matrix-addressed display device as described above, if the sampling frequency generator is constructed of a PLL, fine picture display is difficult to obtain, due to disturbances of the sampling timing resulting from frequency or phase instability of the oscillating output pulse. Futhermore, power is consumed unnecessarily by the fact that the oscillating pulse from the samplng frequency pulse generator is outputted continuously, even during periods wherein a sampling pulse is not required, such as the period where the output enable pulse g of FIG. 6 is high-level.

SUMMARY OF THE INVENTION

This invention provides a matrix-addressed display device capable of displaying clear pictures with low power consumption.

Specifically, this invention consists in a matrix-addressed display device comprising:

a sampling frequency generator; means for sampling a frequency signal that is generated by the generator; serial-parallel conversion means that holds this sampled signal; and picture display means that utilizes this serial-parallel converted signal;

which device is equipped with means for stopping operation of said sampling frequency generator during periods in which said serial-parallel eonversion is not required.

According to one aspect of the invention, the sampling frequency generator includes a gated oscillator and a horizontal counter, the gated oscillator being so constructed that it starts oscillating with a timing that is linked to a horizontal synchronizing signal that is either contained in the input picture signal or separately input, the output pulse produced by this oscillation being counted by the horizontal counter so that oscillation is stopped at the point of time at which a number of pulses have been outputted that is related to the number of pixels in the horizontal direction.

According to a further aspect of this invention, the sampling frequency generator includes a vertical counter and the gated oscillator is of a construction such that it starts oscillating with a timing that is related to the vertical synchronizing signal and the horizontal saychronizing signal, these being either separately inputted or contained as part of the input picture signal, and the horizontal synchronizing signal is counted, from this time-point, by the vertical counter until a count value is reached that is related to the number of pixels in the vertical direction, and stopping and starting of oscillation are repeated, with the timing of starting of oscillation being related to the horizontal synchronizing signal.

DETAILED DESCRIPTION OF THE PREFERRED EMBODIMENT

Figure 1:
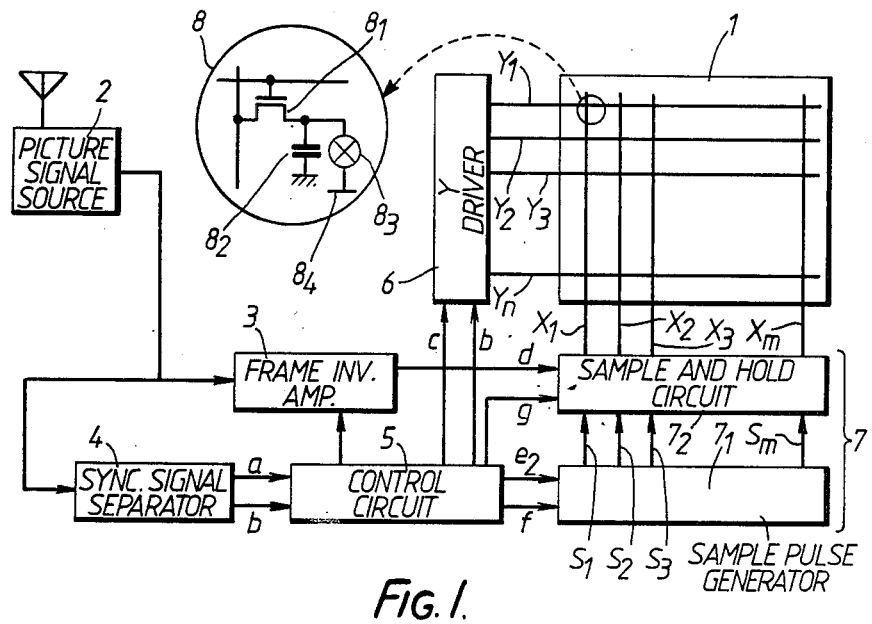
FIG. 1 is a block diagram showing an embodiment of this invention.

FIG. 1 shows s matrix-addressed display device constituting an embodiment of this invention. The basic construction of this matrix-addressed display device involves producing a display such as a television picture using a thin film transistor TFT array type liquid crystal displaypanel. As shown in FIG. 1, signal lines X1, ..., Xm and address lines Y1, ..., Yn are arranged in an intersecting manner within the liquid crystal display panel 1, while a picture signal source 2, a frame inverting amplifier 3, a synchronizing signal separator 4, a control circuit 5, a Y driver 6, and a X driver 7 are provided around the periphery of the panel. X driver 7 consists of a sampling pulse generator $7_1$ and a sample and hold circuit $7_2$. Pixels 8 in the liquid crystal display panel 1 are composed of respective TFT $8_1$, signal storage capacitor $8_2$, liquid crystal cell $8_3$, and counter electrode $8_4$.

Figure 6:
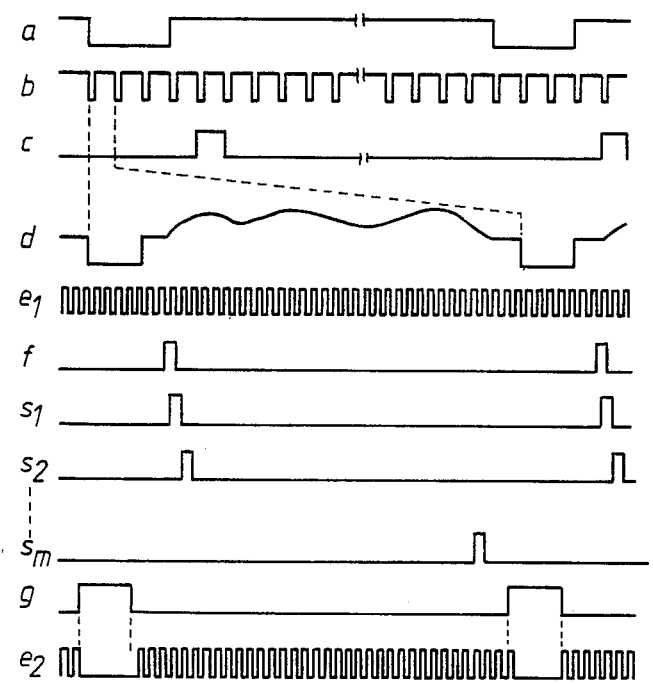
FIG. 6 is a waveform diagram given in explanation of the operation of the matrix-addressed display device.
Figure 7:
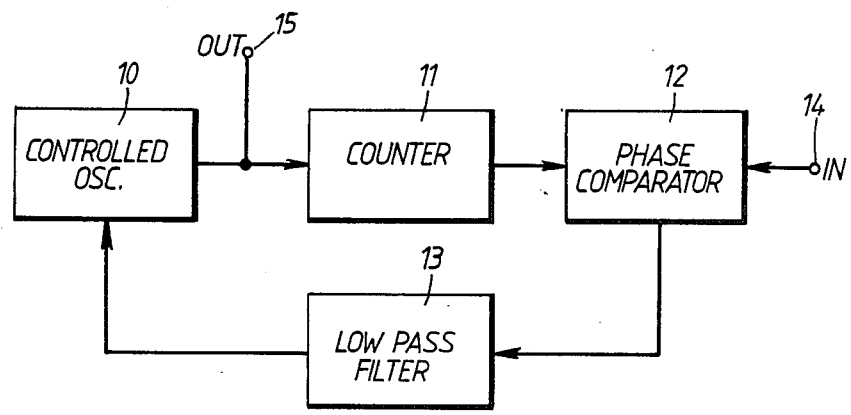
FIG. 7 is a block diagram showing an example of the sampling frequency generator of a conventional device.

Specifically, the output signal from picture signal source 2 is applied to frame inverting amplifier 3 and synchronizing signal separator 4. The subsequent waveforms of each signal coincide with the corresponding symbols a to g of FIG. 6. Synchronizing signal separator 4 separates vertical synchronizing signal a and horizontal synchronizing signal b from the aforementioned signal and supplies them to control circuit 5. Frame inverting amplifier 3 generates picture signal d, inverted in polarity with every frame, in synchronizm with the signal from the control circuit, and supplies it to sample and hold circuit $7_2$.

Control circuit 5 receives vertical synchronizing signal a and horizontal synchronizing signal b and supplies horizontal synchronizing signal b and vertical scanning start signal c, which is synthesized from the synchronizing signals a and b, to Y driver 6. Furthermore, control circuit 5 generates sampling frequency signal e2 and horizontal scanning start signal f based on horizontal synchronizing signal b, and delivers them as input to sampling pulse generator $7_1$. It also delivers output enable pulse g form this circuit 5 to sample and hold circuit $7_2$.

Sampling pulse generator $7_1$ receives signals e2 and f and generates sampling pulses S1, ..., Sm. These sampling pules S1, ..., Sm are supplied to sample and hold circuit $7_2$, which successively samples and holds picture signal d at each horizontal scanning period, to convert it into a parallel picture signal. When this converison is complete, the parallel picture signal is simultaneously delivered from sample and hold circuit $7_2$ to signal lines X1, ..., Xm of liquid crystal display panel 1, under the control of output enable pulse g from control circuit 5. At this point, the video signal voltage is written into signal storage capacitor $8_2$ from signal lines X1, ..., Xm through the TFT $8_1$ which has been put into a conductive state by one or other of the address lines Y1, ..., Yn being put in a selected state by the vertical scanning pulse from Y driver 6. This video signal voltage is held throughout the frame scanning period so that picture display is effected by excitation of the liquid crystal cells $8_3$ by this held voltage.

In this embodiment, the aforementioned sampling frequency generator has special features.

This sampling frequency generator is described in more detail with reference to FIG. 2. This sampling frequency generator consists of: gated oscillator 20, horizontal counter 21, inverter 22, D type flip-flop 23, monostable multivibrator 24, and horizontal synchronizing signal input terminal 25. Gated oscillator 20 is constituted by: 2-input NAND gate $20_1$, inverter $20_2$, buffer $20_3$, control input terminal $20_4$, input terminal $20_5$ for constituting the oscillating circuit, output terminals $20_6$, $20_7$, resistor $20_8$ for determining the frequency of oscillation, capacitor $20_9$, and sampling frequency output terminal $20_{10}$.

Figure 2:
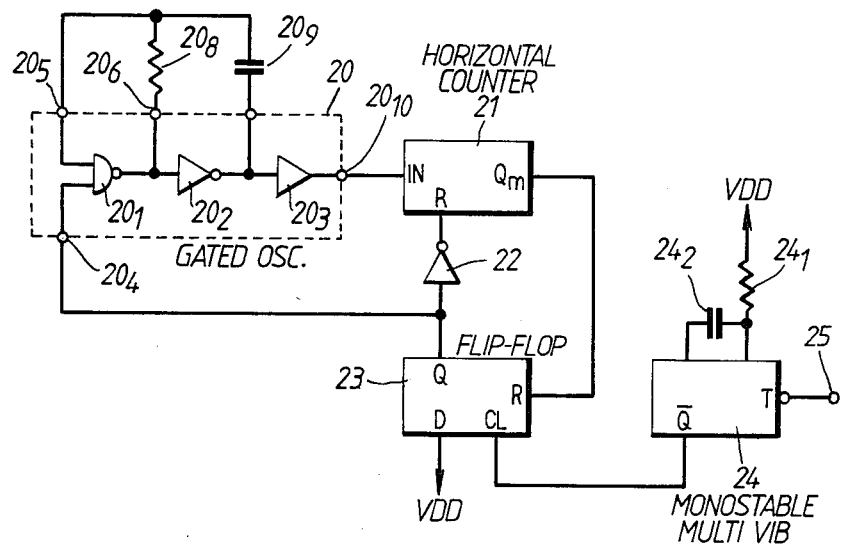
FIG. 2 is a circuit diagram showing major parts of Fig. 1.
Figure 3:
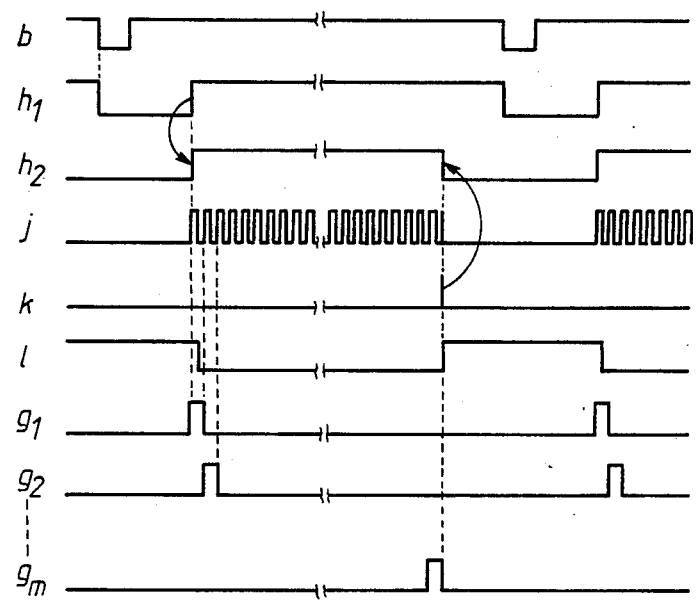
FIG. 3 is a waveform diagram given is explanation of FIG. 2.

FIG. 3 is a waveform diagram given in explanation of the operation of the embodiment shown in FIG. 2. First of all, when horizontal synchronizing pules b, which is either contained in the input video signal or separately supplied is supplied to the horizontal synchronizing input terminal 25, at the output $\overline{Q}$ of the monostable multivibrator, pulse h1 is obtained, with the width of this pulse being determined by the resistor $24_1$ and the capacitor $24_2$. On the rising edge of for example pulse h1 of timing related to the horizontal synchronizing signal, output Q of flip-flop 23 changes from low level to high level as shown by waveform h2, starting the oscillation of gated oscillator 20 using a logic gate, and releasing the reset of horizontal counter 21. Also oscillating output pulse j obtained at output terminal $20_{10}$ of gated oscillator 20 is counted by being input tohorizontal counter 21. The output from output terminal Qm of horizontal counter 21 changes from low level to high level when a number of oscillating pulses j is output, which numbr is related to the number of pixels in the horizontal direction, being for example equal to or a little greater than the number of pixels in the horizontal direction of the display panel. When the output from output terminal Qm goes to high level, flip-flop 23 is reset, making the output from output terminal Q go to low level. This stops the pulse oscillations of the gated oscillator 20, resets the horizontal counter 21, and returns the output from output terminal Qm to low level. Consequently, the output from output terminal Qm varies in accordance with the waveform K. When horizontal synchronizing pulse b again arrives at the input terminal 25, the sequence of events described above is repeated.

In this embodiment, for the sampling frequency signal, the frequency of oscillation of the gated oscillator 20 can be selected using the resistor $20_8$ and capacitor $20_9$, and the time-point at which oscillations start can be controlled by the resistor $24_1$ and the capacitor $24_2$ of the monostable multivibrator 24. Furthermore, a sampling pulse for the inut video signal as shown in FIG. 3 g1, ..., gm can be obtained if a horizontal scanning start pulse 1 is formed as shown in FIG. 3 and supplied to sampling pulse generator $7_1$ of FIG. 1 together with pulse j.

In this embodiment, the generation of the sampling frequency signal is by free-running oscillation, so there is no fluctuation of frequency or phase. Also, since the sampling frequency generator is constituted by a gated oscillator, starting and stopping of oscillation can be controlled so that the sampling frequency signal is generated only in the period of display of the video signal during horizontal scanning. This makes it possible to save power by reducing the number of switching operations.

Figure 4:
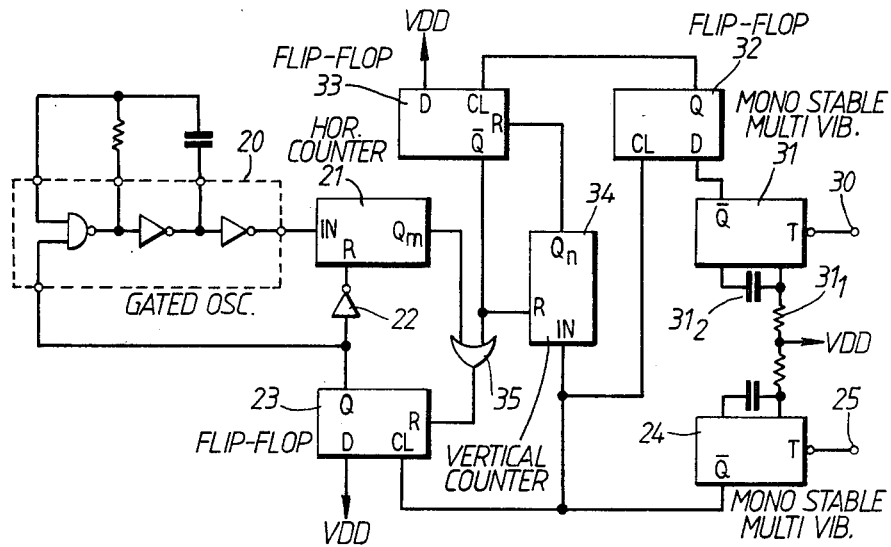
FIG. 4 is a circuit diagram of major parts of another embodiment of this invention.

FIG. 4 shows a further embodiment of this invention. Parts which are the same as in the embodiment of FIG. 1 and FIG. 2 are given the same reference numerals. Further to the embodiment of FIG. 2, this embodiment is equppped with vertical synchronizing signal input terminal 30, monostable multivibrator 31, D type flip-flops 32 and 33, vertical counter 34 and 2-input OR gate 35.

Figure 5:
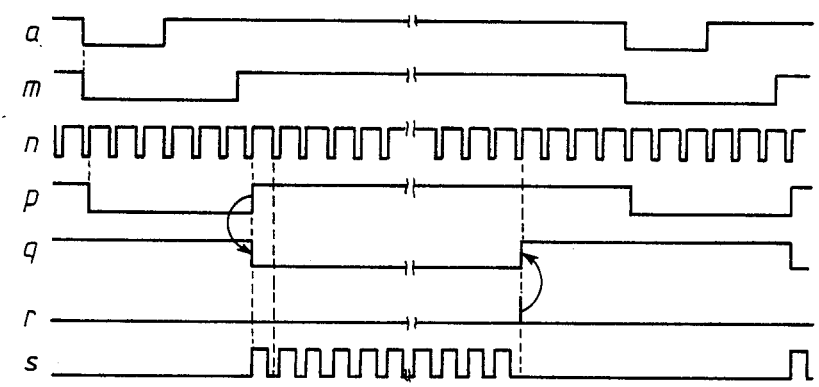
FIG. 5 is a waveform diagram given in explanation of FIG. 4.

FIG. 5 is a waveform diagram showing the operation of the embodiment shown in FIG. 4. First of all, when vertical synchronizing pulse a, which is the vertical synchronizing signal either contained in the input video signal or separately input, is supplied to vertical synchronizing signal input terminal 30, pulse m of width determined by resistor $31_1$ and capacitor $31_2$ is obtained at output $\overline{Q}$ of monostable multivibrator 31. This pulse m is input to the flip-flop 32, a nd clock-synchronized with output pulse n of monostable multivibrator 24, which has the period of the horizontal scan, to obtain pulse p at output Q of flip-flop 32. On the leading edge of pulse p, the output $\overline{Q}$ of flip-flop 33 changes from high level to low level as shown by the waveform q, releasing the reset of flip-flop 23 and opening the circuit from output Qm of horizontal counter 21 to reset terminal R of flip-flop 23. This starts the operation of the portion which is the same as in the embodiment of Fig. 2. At the same time as this, the reset of vertical counter 34 is released, so that pulses n which are being input are counted by vertical counter 34. At the time-point when a number of these pulses n which is related to the number of pixels in the vertical direction of the display panel and is for example equal to or slightly greater than this number of pixels has been output, the output from output terminal Qn of vertical counter 34 changes from low level to high level. When the output from output terminal Qn becomes high-level, flip-flop 33 is reset, with the result that the output from output trminal $\overline{Q}$ becomes high-level. Flip-flop 23 is then reset by means of 2-input OR gate 35, and vertical counter 34 is also reset, causing the output from output terminal Qn to return to low level. The output from output terminal Qn therefore varies as waveform r, and the output from output terminal Q of flip-flop 23 varies as waveform s. Thus operation of the portion that is the same as in the FIG. 2 embodiment is stopped at the time-point when vertical counter 34 has counted the prescribed number of output pulses n. The sequence of operations described above is repeated when vertical synchronizing pulse a is again supplied.

In addition to providing the same effect as the preceding embodiment, this embodiment enables the portion corresponding to the preceding embodiment to be started and stopped in response to whether the output from output terminal $\overline{Q}$ of flip-flop 33 is high or low. That is, a further power saving can be obtained thanks to the fact that oscillation of gated oscillator 20 and counting by horizontal counter 21 do not take place whilst output terminal $\overline{Q}$ of flip-flop 33 is high-level.

In the above two embodiments, the oscillating circuit of gated oscillator 20 is constructed using resistor $20_8$ and capacitor $20_9$. However, the invention is not restricted to this, and the oscillating circuit may be constructed using for example an inductor and a capacitor. Or if the sampling frequency or dot clock is input from outside together with the video signal, resistor $20_8$ and capacitor $20_9$ of gated oscillator 20 can be dispensed with, and input terminal $20_5$ utilized as the sampling frequency input terminal.

As described above, since the matrix-addressed display device of this invention employs as the sampling frequency generator a gated oscillator controlled by a logic gate, a sampling frequency signal with little fluctuation of frequency or phase can be generated and a clear picture obtained. And a considerable saving in power can be obtained, thanks to the fact that its operation is stopped in periods when generation of a sampling frequency signal is not required. This saving is particularly great if a CMOS circuit construction is used.

What is claimed is:
1. A matrix-addressed display device comprising:
a gated oscillator;
a sampling pulse generator generating sampling pulses in response to the output of said gated oscillator;
means for sampling a serially inputted video signal with said sampling pulses;
means for holding the sampled signal and converting it from a serial signal to a parallel signal;
picture display means for utilizing said parallel converted signal; and
means for stopping the operation of said gated oscillator during any period when said serial-parallel conversion is not required for the display of the inputted video signal having a logic gate coupled to said gated oscillator for stopping and for starting the oscillation of said gated oscillator in response to a control signal; and
a horizontal counter coupled to said logic gate, said counter counts the oscillated pulse of said gated oscillator up to the predetermined number of horizontal pixeles in relationship to an inputted hori- zontal synchronization signal and output said control signal to said logic gate.

2. The matrix-addressed display device of claim 1, wherein said means for stopping the operation of said gated oscillator further comprises:
a vertical counter coupled to said logic gate, said counter counts said inputted horizontal synchronization signal up to the predetermined number of vertical pixeles in relationship to an inputted vertical synchronization signal and outputs said control signal to said logic gate.

* * * * *